United States Patent
Chen et al.

(10) Patent No.: US 10,657,024 B2
(45) Date of Patent: *May 19, 2020

(54) BREAKPOINT WITH SPECIFIED ANCHOR POINTS

(71) Applicant: International Business Machines Corporation, Armonk, NY (US)

(72) Inventors: Xiao Ling Chen, Beijing (CN); Chuan He, Beijing (CN); Yan Huang, Beijing (CN); Jiang Yi Liu, Beijing (CN); Wei Wu, Beijing (CN); Jian Xu, Milton (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/518,089

(22) Filed: Jul. 22, 2019

(65) Prior Publication Data
US 2019/0347183 A1    Nov. 14, 2019

Related U.S. Application Data

(63) Continuation of application No. 15/826,795, filed on Nov. 30, 2017.

(51) Int. Cl.
*G06F 11/00* (2006.01)
*G06F 11/36* (2006.01)

(52) U.S. Cl.
CPC ...... *G06F 11/3608* (2013.01); *G06F 11/3624* (2013.01); *G06F 11/3664* (2013.01)

(58) Field of Classification Search
CPC ............. G06F 11/3664; G06F 11/3608; G06F 11/3409; G06F 11/3466; G06F 11/0706; G06F 11/0718; G06F 11/3612; G06F 11/3636; G06F 11/366; G06F 11/3668; G06F 11/3672; G06F 11/3688
USPC ...................... 714/38.13, 38.1, 25
See application file for complete search history.

(56) References Cited

U.S. PATENT DOCUMENTS

| | | |
|---|---|---|
| 7,047,519 B2 | 5/2006 | Bates et al. |
| 8,726,209 B1 | 5/2014 | Lamant et al. |
| 8,756,572 B2 | 6/2014 | Halliday et al. |

(Continued)

FOREIGN PATENT DOCUMENTS

WO    2015079291 A1    6/2015

OTHER PUBLICATIONS

List of IBM Patents or Patent Applications Treated as Related; (Appendix P), Filed Jul. 22, 2019; 2 pages.

(Continued)

*Primary Examiner* — Sarai E Butler
(74) *Attorney, Agent, or Firm* — Cantor Colburn LLP; Noah Sharkan

(57) ABSTRACT

A system and method to verify software includes a debugger setting a breakpoint in the software. The breakpoint indicates a point at which to pause or stop execution of the software. The method also includes setting one or more anchor points associated with the breakpoint. Each of the one or more anchor points represents another point in the software that must be executed prior to pausing or stopping the execution of the software at the breakpoint.

20 Claims, 6 Drawing Sheets

(56) References Cited

U.S. PATENT DOCUMENTS

| | | | |
|---|---|---|---|
| 2007/0162162 A1* | 7/2007 | Kumar | G05B 17/02 700/29 |
| 2009/0002024 A1 | 1/2009 | Hutchings et al. | |
| 2009/0007027 A1 | 1/2009 | Hutchings et al. | |
| 2009/0125888 A1 | 5/2009 | Von Der Ahe et al. | |
| 2012/0079459 A1* | 3/2012 | Bates | G06F 11/3636 717/129 |
| 2013/0117732 A1 | 5/2013 | Zoller et al. | |
| 2013/0318504 A1 | 11/2013 | Eker et al. | |
| 2015/0143344 A1* | 5/2015 | Davis | G06F 8/751 717/129 |
| 2015/0199258 A1 | 7/2015 | Deckert et al. | |
| 2016/0306729 A1 | 10/2016 | Bates et al. | |
| 2017/0322867 A1* | 11/2017 | Jiao | G06F 11/3624 |
| 2019/0026649 A1* | 1/2019 | Hizkiev | G06F 21/51 |
| 2019/0163605 A1 | 5/2019 | Chen et al. | |

OTHER PUBLICATIONS

List of IBM Patents or Patent Applications Treated as Related; (Appendix P), Filed Oct. 30, 2019; 2 pages.
Xiao Ling Chen et al., "Breakpoint With Specified Anchor Points", U.S. Appl. No. 16/668,130, filed Oct. 30, 2019.

* cited by examiner

BREAKPOINT WITH SPECIFIED ANCHOR POINTS

DOMESTIC PRIORITY

This application is a continuation of U.S. application Ser. No. 15/826,795 filed Nov. 30, 2017, the disclosure of which is incorporated herein in its entirety.

BACKGROUND

The present invention relates to software debugging, and more specifically, to a breakpoint with specified anchor points.

Debugging refers to the process of verifying software code by finding and resolving defects or problems within the code that can prevent incorrect operation of the application implemented by the code. In order to isolate errors during debugging, breakpoints can be set to intentionally stop or pause a place in a program in order to check intermediate results, for example. The place can be a function, a line number, or an address location. Sometimes, a particular execution path within a program is of interest. For example, a programmer may wish to stop or pause the program at a function when that function is reached following a particular sequence of executions of intermediary functions.

SUMMARY

Embodiments of the present invention are directed to a computer-implemented method of verifying software that includes setting, with a processor implementing debugging instructions, a breakpoint in the software. The breakpoint indicates a point at which to pause or stop execution of the software. The method also includes setting, with the processor, one or more anchor points associated with the breakpoint. Each of the one or more anchor points represents another point in the software that must be executed prior to pausing or stopping the execution of the software at the breakpoint.

Additional embodiments of the present invention are directed to a system to verify software. The system includes a memory device including a data structure that defines a breakpoint in the software. The breakpoint indicates a point at which to pause or stop execution of the software. The system also includes a processor to set one or more anchor points associated with the breakpoint. Each of the one or more anchor points represents another point in the software that must be executed prior to pausing or stopping the execution of the software at the breakpoint.

Further embodiments of the present invention are directed to a computer program product for implementing software verification. The computer program product comprises a computer readable storage medium having program instructions embodied therewith that are executable by a processor to perform a method. The method includes setting a breakpoint in the software. The breakpoint indicates a point at which to pause or stop execution of the software. The method also includes setting one or more anchor points associated with the breakpoint. Each of the one or more anchor points represents another point in the software that must be executed prior to pausing or stopping the execution of the software at the breakpoint.

DETAILED DESCRIPTION

As previously noted, a debugger facilitates finding and solving issues in software code. Breakpoints can be used to pause or stop the execution of a program to examine the results. Breakpoints can be set at a function, a line number, or an address. Sometimes, a breakpoint is desired following a particular sequence of executions. That is, a particular number of executions each of set of intermediary functions may be desired before the breakpoint at a subsequent function is implemented. In prior debuggers, a series of breakpoints would be needed at each of the intermediary functions to implement the desired breakpoint at the subsequent function. The setting and removing of the intermediary breakpoints can prove inefficient, especially in long and complicated applications. According to another prior approach, conditional breakpoints could be used. This requires the insertion of a new variable for each conditional breakpoint and a recompilation of the application to implement the conditional breakpoint. In addition, the application must be recompiled again after removing the variable used for the conditional breakpoint. Thus, this approach is also inefficient and tedious.

Embodiments of the systems and methods detailed herein relate to debuggers that set a breakpoint with specified anchor points. The anchor points act as internal breakpoints that do not pause or stop execution but indicate the completion of the intermediary execution that is designated as an anchor point. The number of executions of each anchor point that are required to trigger the breakpoint can be specified, as well. Thus, without the need for intermediary breakpoints or conditional breakpoints, the anchor points, according to one or more embodiments of the invention, facilitate implementing a breakpoint based on a particular execution path. The debugger and debugging processes that use the anchor points, according to the embodiments of the invention, improve the field of application development by allowing faster and more direct and convenient debugging of issues.

Figure 1:
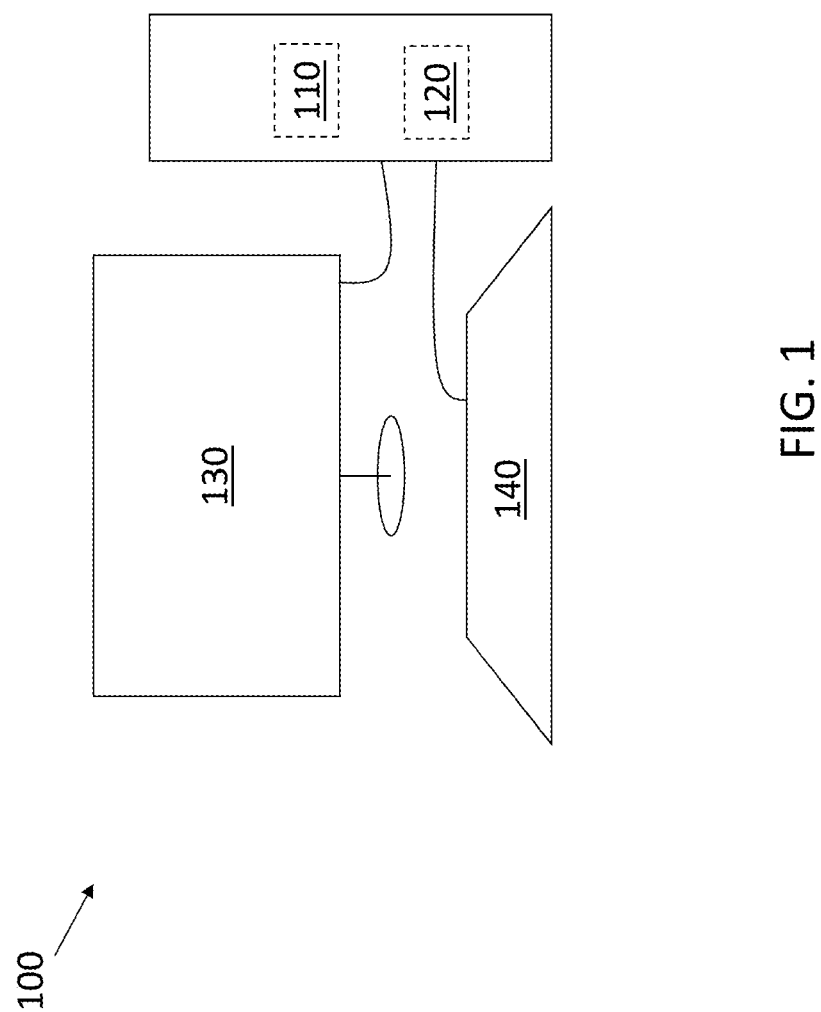
FIG. 1 depicts an exemplary system that includes a debugger according to one or more embodiments of the invention.

FIG. 1 depicts an exemplary system 100 that includes a debugger according to one or more embodiments of the invention. The exemplary system 100 is a computer with processing circuitry that includes one or more processors 110 and one or more memory devices 120. The processing circuitry may be implemented in an application specific integrated circuit (ASIC), electronic circuit, combinational logic circuit or other known processing device. The exemplary system 100 includes one or more output interfaces 130 (e.g., display monitor) and one or more input interfaces 140 (e.g., keyboard). The one or more memory devices 120 can store instructions processed by the one or more processors 110 to implement the functionality of the debugger that are detailed. Thus, while references are made to the debugger in the explanation of the various embodiments of the invention, it should be understood that the functionality is achieved with the processing circuitry of the system 100.

Figure 2:
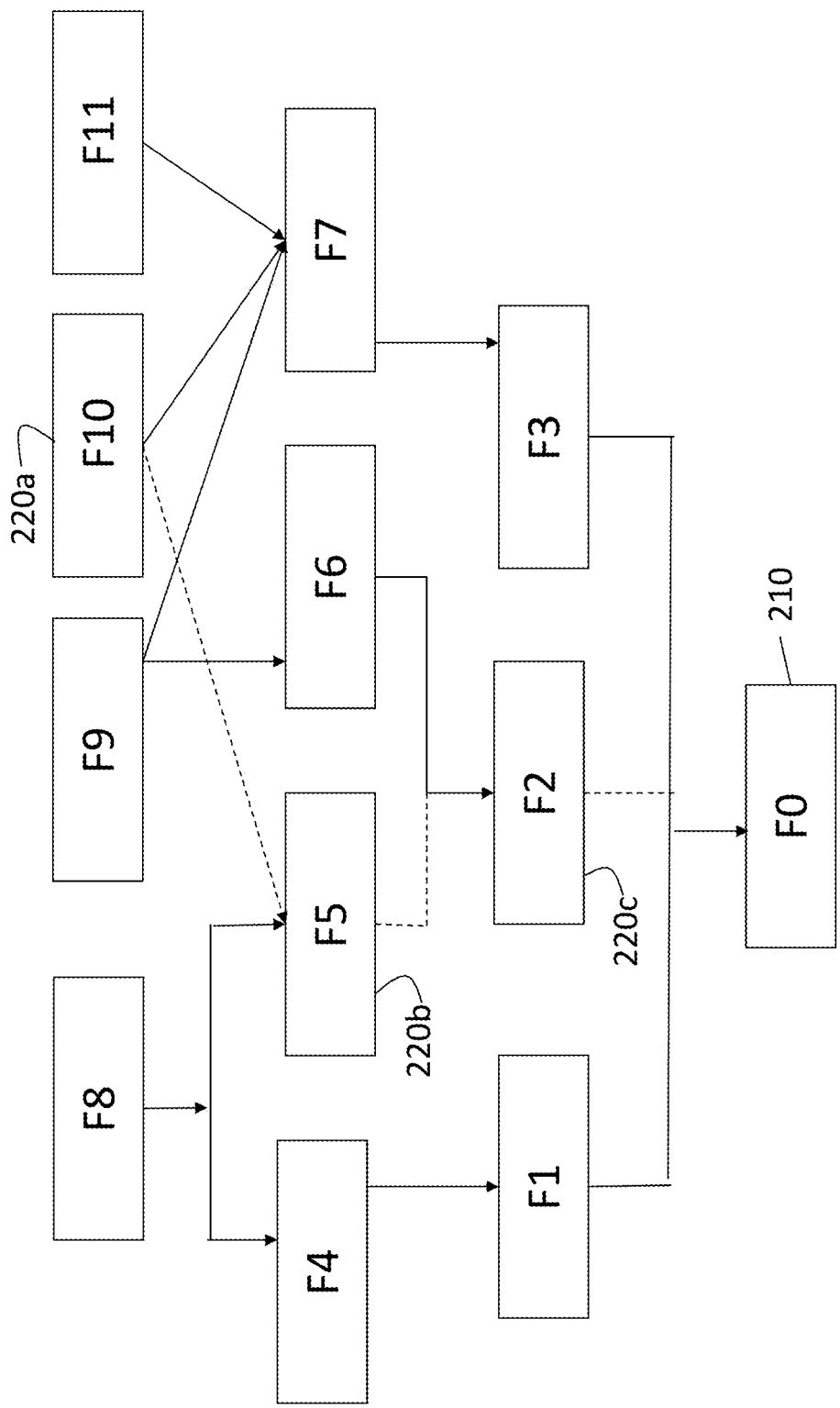
FIG. 2 shows an exemplary application that includes a breakpoint with specified anchor points according to one or more embodiments of the invention.

FIG. 2 shows an exemplary application that includes a breakpoint 210 with specified anchor points 220 according to one or more embodiments of the invention. Twelve functions F0 through F11 are shown for the exemplary application. While the example discussed for explanatory purposes is an application with multiple functions, a breakpoint 210 can be set at a particular line number within a function or at a specific address, as previously noted. The discussion with reference to FIG. 2 applies, as well, to other types of breakpoints 210.

A breakpoint 210 is set at function F0, but the breakpoint 210 is only to be implemented based on a particular execution path of interest being followed. That is, as FIG. 2 indicates, the function F0 can be reached through a number of execution paths. For example, function F8 can call function F4, which calls function F1, which then calls function F0. Function F8 can also call function F5 which follows an execution path through function F2 to call function F0. As yet another example, function F11 can call function F7, which calls function F3, which calls function F0.

The execution path of interest, indicated with dashed lines, is from function F10 to function F5, to function F2, and then to function F0. In addition, the execution path of interest can involve a particular number of times that each of the functions F10, F5, and F2 is called. For example, it may be desirable to implement a breakpoint 210 at function F0 only after function F10 has been executed once, F5 has been executed twice, and F2 has been executed three times. The number of executions can be referred to as hits. Thus, the breakpoint 210 at function F0 is implemented after function F10 hits one time, function F5 hits two times, and function F2 hits three times.

As previously noted, prior debuggers would implement and remove breakpoints at functions F10, F5, and F2 or establish conditional breakpoints that require recompiling the application. According to one or more embodiments of the invention, functions F10, F5, and F2 are respectively set as anchor points 220a, 220b, 220c (generally referred to as 220) for the breakpoint 210 at function F0. The debugger sets each of the anchor points 220 with a specified hit count. Thus, in the exemplary case, the anchor point 220a at function F10 is associated with one hit, the anchor point 220b at function F5 is associated with two hits, and the anchor point 220c at function F2 is associated with three hits. The debugger, which includes the instructions that are processed by a processor to perform the debugging functionality, manages anchor points 220 in a data structure such as a list, for example. The data structure includes fields associated with each anchor point 220, as discussed with reference to FIG. 3.

Figure 3:
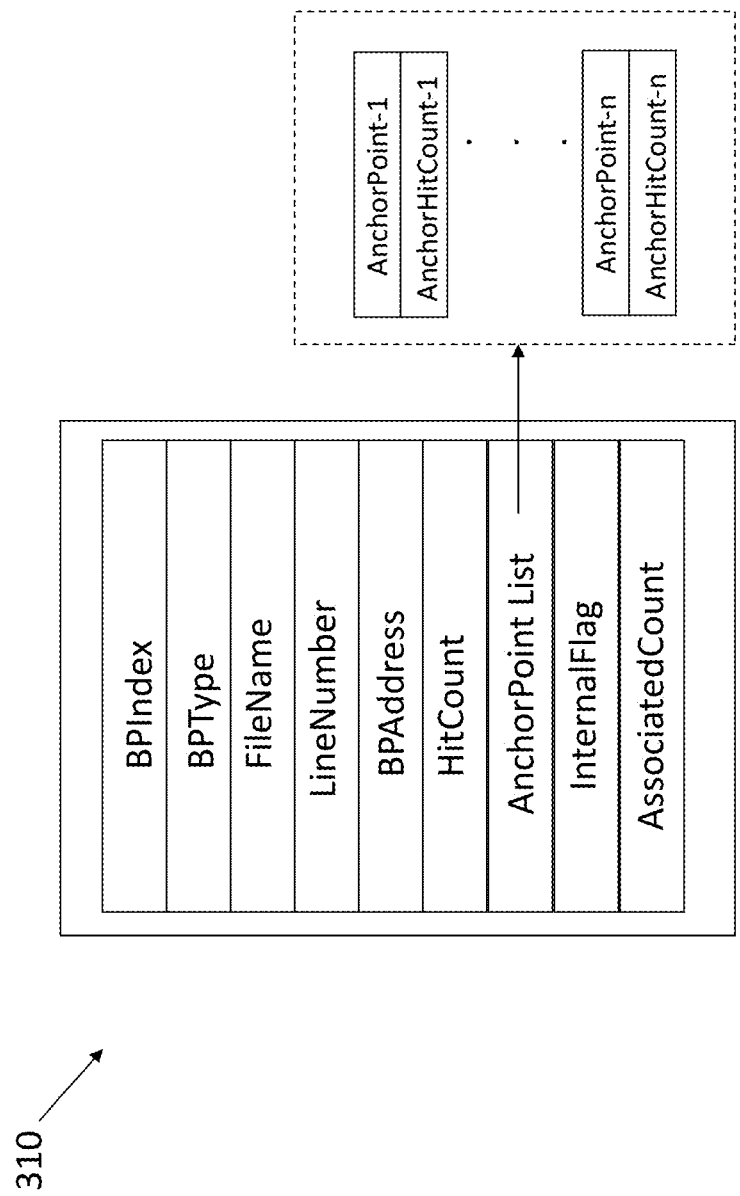
FIG. 3 illustrates an exemplary data structure associated with each anchor point and breakpoint according to an embodiment of the invention.

FIG. 3 illustrates an exemplary data structure 310 associated with each anchor point 220 and breakpoint 210 according to an embodiment of the invention. While the exemplary fields are used for explanatory purposes in the discussions of FIGS. 4-6, other fields that include similar information may be used in the processes shown in FIGS. 4-6. As FIG. 3 indicates, the fields of the exemplary data structure 310 include BPIndex, which is the index of the breakpoint 210 or anchor point 220 among all breakpoints 210 and anchor points 220 that are set. BPType indicates whether the breakpoint 210 or anchor point 220 is a function, a line number, or an address. The fields FileName, LineNumber, and BPAddress identify the location of the breakpoint 210 or anchor point 220 based on the type of the breakpoint 210 or anchor point 220. The field HitCount is a counter that increases by one each time the breakpoint 210 or anchor point 220 is executed.

The three fields AnchorPoint List, InternalFlag, and AssociatedCount are exemplary fields that are specific to the one or more embodiments of the invention. While the previously discussed fields exemplify information that is generally tracked for breakpoints 210 by a debugger, the last three fields would not be part of a typical data structure because anchor points 220 are not used by prior debuggers.

The AnchorPoint List field is empty for an anchor point 220, but, for a breakpoint 210, the AnchorPoint List field includes information identifying each anchor point 220 of the given breakpoint 210 and the number of executions of each anchor point 220. Exemplary components of the AnchorPoint List field are indicated in FIG. 3 for an exemplary set of n anchor points 220. While the HitCount field tracks the number of times the breakpoint 210 function, line number, or address has been executed, the information maintained as part of the AnchorPoint List field (e.g., AnchorHitCount field associated with AnchorPoint field) tracks the number of times each anchor point 220 of the breakpoint 210 has been executed.

The InternalFlag field is set to "False" as a default and is only set to "True" when it is part of the data structure 310 of an anchor point 220. This field indicates that the debugger processes each anchor point 220 as an internal breakpoint. While an InternalFlag setting of "False," which is associated with a breakpoint 210, may result in pausing or stopping execution, the InternalFlag setting of "True," which is associated with an anchor point 220, will not result in execution pausing or stopping.

It bears noting that an anchor point 220 for a given breakpoint 210 can be a breakpoint 210 itself. Conversely, a breakpoint 210, with or without its own anchor points 220, can be an anchor point 220 for another breakpoint 210. When a function, line number, or address is both a breakpoint 210 and an anchor point 220, then the InternalFlag field of the function, line number, or address is left as "False" to ensure that execution is paused or stopped when conditions for its designation as a breakpoint 210 are met.

When a given function, line number, or address is identified as an anchor point 220 for one or more breakpoints 210, the AssociatedCount field indicates the number of breakpoints 210 for which the function, line number, or address is designated as an anchor point 220. Thus, a single data structure 310 can be associated with a function, line number, or address that has multiple anchor point 220 designations. The AssociatedCount field is empty for a breakpoint 210.

Figure 4:
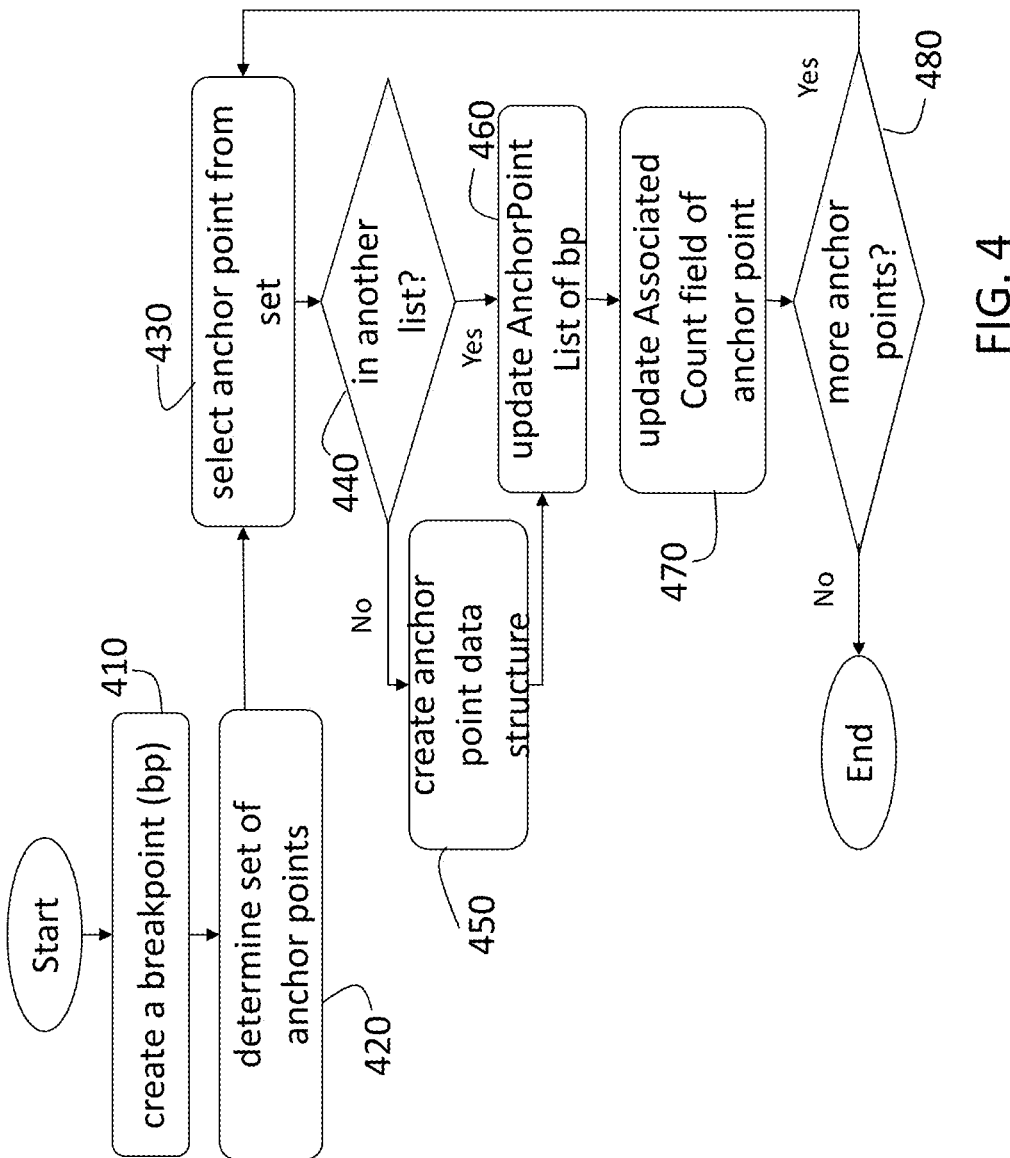
FIG. 4 is a process flow of a method of the debugger adding a breakpoint with one or more associated anchor points according to one or more embodiments of the invention.

FIG. 4 is a process flow of a method of the debugger adding a breakpoint 210 with one or more associated anchor points 220 according to one or more embodiments of the invention. At block 410, creating the breakpoint 210 (bp) includes creating a data structure 310 with a new BPindex value. The data structure 310 is populated with values that specify the type of the new breakpoint 210 (e.g., with the BPType field) and the location of the new breakpoint 210 (e.g., with the FileName, LineNumber, and/or BPAddress fields). The HitCount can be initialized to 0. At block 420, determining the set of anchor points 220 includes, as an example, determining that functions F10, F5, and F2 are anchor points 220 for the above-discussed exemplary breakpoint 210 at function F0.

The processes at blocks 430 through 480 are then performed for one of the set of anchor points 220 at a time. At block 430, selecting an anchor point 220 from the set refers to beginning with the first anchor point 220 and selecting the next anchor point 220 from the set for each iteration. At block 440, determining if the selected anchor point 220 is in another list refers to determining whether the selected anchor point 220 is already a breakpoint 210 or another anchor point 220 such that the selected anchor point 220 already has a data structure 310 associated with it. A determination is made of whether the debugger includes the anchor point 220 in a listing of breakpoints 210 (e.g., a field that may be referred to as BPList) or in an AnchorPoint List field of a data structure 310 of an existing breakpoint 210. If the determination at block 440 is that the selected anchor point 220 is not in another list (i.e., is not already a breakpoint 210 or anchor point 220), then the processing includes creating the data structure 310 for the selected anchor point 220, at block 450.

Whether the data structure 310 of the selected anchor point 220 exists already or was created at block 450, updating the AnchorPoint List of the breakpoint 210 that is being created, at block 460, refers to modifying the data structure 310 associated with the breakpoint 210 that is being added. For example, the identity of the selected anchor point 220 is added along with an initialized hit count (e.g., AnchorHitCount sub-field of the AnchorPoint List field). At block 470, updating the AssociatedCount field of the data structure 310 associated with the selected anchor point 220 refers to incrementing the count of the number of breakpoints 210 with which the selected anchor point 220 is associated. The check at block 480 ensures that the processes at blocks 430 through 470 are repeated for each of the anchor points 220 that are associated with the breakpoint 210 that is being added.

Figure 5:
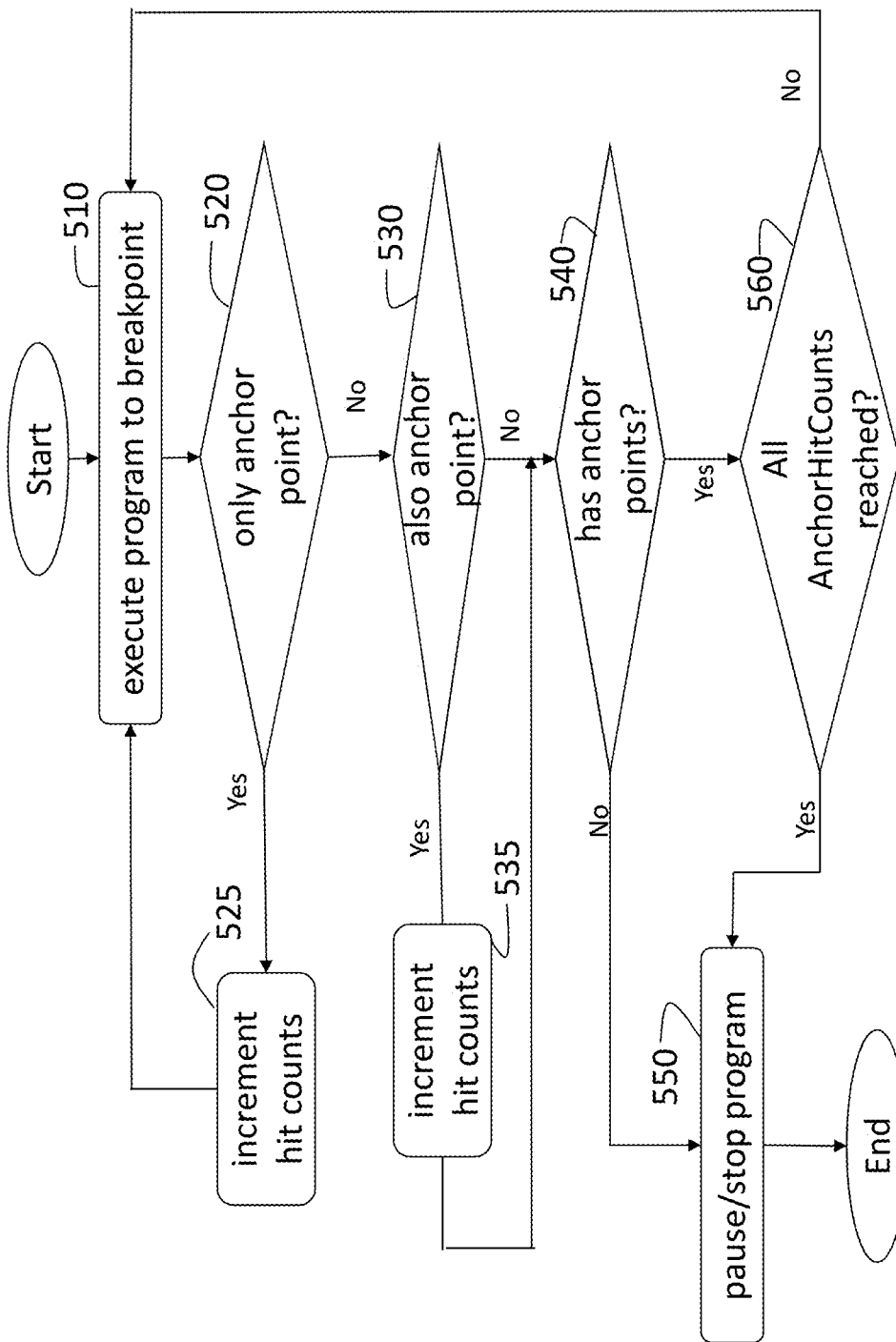
FIG. 5 is a process flow of a method of executing an application that includes one or more anchor points associated with a breakpoint according to one or more embodiments of the invention.

FIG. 5 is a process flow of a method for executing an application that includes one or more anchor points 220 associated with a breakpoint 210 according to one or more embodiments of the invention. At block 510, executing the program to the breakpoint 210 refers to reaching a function, line number, or address that has a data structure 310 associated with it (i.e., that has a corresponding BPIndex). A check is done, at block 520, of whether an anchor point 220 alone has been reached, rather than an anchor point 220 that is additionally a breakpoint 210 or a breakpoint 210 itself. For example, the InternalFlag field of the data structure 310 can be checked and, if it is set to "True," then an anchor point 220 (i.e., an internal breakpoint) has been reached rather than a breakpoint 210 or a breakpoint 210 that is also used as an anchor point 220 for a different breakpoint 210.

As previously noted, when a given function, line number, or address is both a breakpoint 210 and an anchor point 220, then the InternalFlag field can be left as "False" so that the function, line number, or address is recognized as a breakpoint 210. Thus, the determination at block 520 addresses whether the execution has reached a point that is a breakpoint 210 but does not address whether the execution has reached a point that is additionally an anchor point 220 for another breakpoint 210.

If it is determined, at block 520, that the execution has reached only an anchor point 220 (e.g., InternalFlag field is "True"), then incrementing hit counts, at block 525, includes incrementing both the hit count in the data structure 310 associated with the anchor point 220 itself (e.g., the HitCount field) but also the appropriate hit count in the data structure 310 associated with every breakpoint 210 with which the anchor point 220 is associated (e.g., the AnchorHitCount in the AssociatedCount field). Execution continues until another breakpoint 210 or anchor point 220 is reached, as indicated, following the process at block 525.

If it is determined, at block 520, that the execution has reached a breakpoint 210 that may or may not also be an anchor point 220 for another breakpoint 210, then a determination is made, at block 530, of whether the breakpoint 210 is also an anchor point 220 for a different breakpoint 210 at a different place in the execution. This determination can be based on whether the AssociatedCount field of the data structure 310 has a value greater than 0, for example. The value of the AssociatedCount field indicates the number of breakpoints 210 for which the currently reached point in the execution (i.e., the breakpoint 210 that has been reached) is an anchor point 220.

If it is determined, at block 530, that the breakpoint 210 that has been reached is also an anchor point 220, then incrementing the hit count, at block 535, refers to incrementing the hit count in the data structure 310 associated with every breakpoint 210 for which the breakpoint 210 that has been reached acts as an anchor point 220 (e.g., the AnchorHitCount in the AssociatedCount field) in addition to incrementing the HitCount field of the data structure 310 of the breakpoint 210 that has been reached.

Whether the process at block 535 is executed or not, a determination is made, at block 540, of whether the breakpoint 210 that has been reached has one or more anchor points 220 associated with it. If it is determined, at block 540, that the breakpoint 210 that has been reached in the execution does not have any anchor points 220 associated with it, then pausing or stopping the program, at block 550, is performed. This facilitates finding and correcting errors, as previously noted.

If it is determined, at block 540, that the breakpoint 210 that has been reached in the execution does have one or more anchor points 220 associated with it, then a check is made at block 560. The determination at block 560 is whether all the anchor points 220 associated with the breakpoint 210 that has been reached have been executed for the number of times specified (e.g., whether all AnchorHitCounts in the AssociatedCount field of the data structure 310 are as specified).

For the example discussed with reference to FIG. 1, when the function F0 (the breakpoint 210) is reached at block 510, a determination is made, at block 560, of whether the functions F10, F5, and F2 have been executed one, two, and three times, respectively. If all the anchor points 220 of the breakpoint 210 that has been reached have been executed the specified number of times, as determined at block 560, then pausing or stopping the program, at block 550, is performed. If all the anchor points 220 of the breakpoint 210 that has been reached have not been executed the specified number of times, as determined at block 560, then execution resumes until the next breakpoint 210 or anchor point 220 (i.e., internal breakpoint) is reached.

Figure 6:
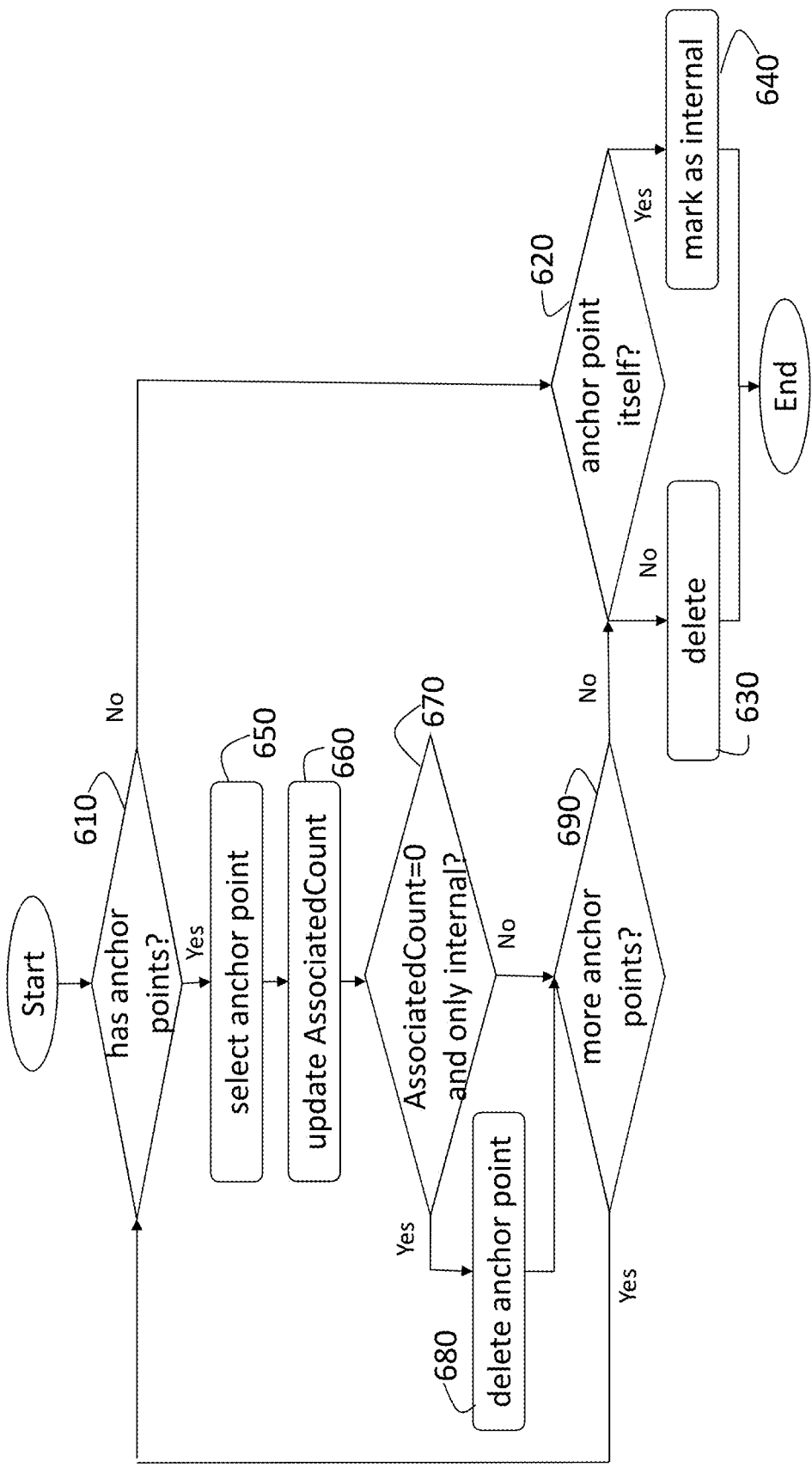
FIG. 6 is a process flow of a method of deleting a breakpoint according to one or more embodiments of the invention.

FIG. 6 is a process flow of a method of deleting a breakpoint 210 according to one or more embodiments of the invention. When the debugger deletes a breakpoint 210, a determination is made, at block 610, of whether the breakpoint 210 being deleted had any associated anchor points 220 (e.g., the AnchorPoint List field is examined). If the breakpoint 210 is determined not to have any associated anchor points 220, at block 610, then a determination is made, at block 620, of whether the breakpoint 210 that is being deleted is itself an anchor point 220 for a different breakpoint 210. This determination can be based on the AssociatedCount field of the data structure 310 of the breakpoint 210 being deleted, for example.

If the breakpoint 210 being deleted is not an anchor point 220 for one or more other breakpoints 210, then deleting the breakpoint 210 is performed at block 630. This refers to deleting the data structure 310 associated with the breakpoint 210, which designates the given function, line number, or address as a breakpoint 210. If the breakpoint 210 being deleted is an anchor point 220 for one or more other breakpoints 210, then marking the breakpoint 210 as internal, at block 640, refers to maintaining the data structure 310 associated with the breakpoint 210 but changing the InternalFlag field to "True," for example, such that the breakpoint 210 is essentially converted to only an anchor point 220 rather than being designated as both a breakpoint 210 and an anchor point 220.

If the breakpoint 210 is determined to have associated anchor points 220, at block 610, then the processes at blocks 650 through 690 are performed iteratively for each anchor point 220. At block 650, an anchor point 220 of the breakpoint 210 to be deleted is selected. For example, the first anchor point 220 in the AnchorPoint List field of the breakpoint 210 can be selected for the first iteration and each subsequent anchor point 220 in the AnchorPoint List can be selected for subsequent iterations. At block 660, updating the AssociatedCount field refers to reducing the number of breakpoints 210 with which the selected anchor point 220 is associated by one.

Based on this reduction, a determination is made, at block 670, of whether the anchor point 220 has no other breakpoints 210 with which it is associated and, additionally, whether the anchor point 220 is not a separate breakpoint 210 itself. If both of these conditions are true (i.e., the anchor point 220 is only an anchor point 220 and is only an anchor point 220 for the breakpoint 210 being deleted), then deleting the anchor point 220 is performed at block 680. This refers to deleting the data structure 310 associated with the selected anchor point 220. The check at block 690 ensures that the processes at blocks 650 through 680 are performed for every anchor point 220 associated with the breakpoint 210 being deleted.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method of verifying software, the computer-implemented method comprising:
    setting, with a processor implementing debugging instructions, a breakpoint in the software that indicates a point at which to pause or stop execution of the software, the setting the breakpoint including creating a data structure that defines the breakpoint; and
    setting, with the processor, one or more anchor points associated with the breakpoint, wherein each of the one or more anchor points represents another point in the software that must be executed prior to pausing or stopping the execution of the software at the breakpoint, wherein the data structure that defines the breakpoint includes a field listing the one or more anchor points associated with the breakpoint and at least one of the one or more anchor points is not itself another breakpoint.

2. The computer-implemented method according to claim 1, wherein the setting the breakpoint includes indicating the point as a function, a line number, or an address.

3. The computer-implemented method according to claim 1, wherein the setting the one or more anchor points includes indicating each of the other points as a function, a line number, or an address.

4. The computer-implemented method according to claim 1, further comprising specifying a hit count corresponding with each of the one or more anchor points, wherein the hit count specifies a number of executions of the respective one or more anchor points.

5. The computer-implemented method according to claim 4, further comprising the processor determining whether each of the one or more anchor points has reached the corresponding hit count prior to the pausing or stopping the execution of the software at the breakpoint.

6. The computer-implemented method according to claim 1, further comprising setting a second breakpoint and a corresponding second set of anchor points, wherein one of the second set of anchor points includes the breakpoint.

7. The computer-implemented method according to claim 1, wherein the data structure that defines the breakpoint also includes a flag identifying the breakpoint as the point at which to pause or stop execution of the software even based on the breakpoint additionally being an anchor point for a different breakpoint.

8. The computer-implemented method according to claim 1, wherein the setting the one or more anchor points includes creating corresponding one or more data structures that define the respective one or more anchor points as an internal breakpoint that does not result in the pausing or stopping the execution of the software.

9. A system to verify software, the system comprising:
    a memory device including a data structure that defines a breakpoint in the software, wherein the breakpoint indicates a point at which to pause or stop execution of the software; and
    a processor configured to set one or more anchor points associated with the breakpoint, wherein each of the one or more anchor points represents another point in the software that must be executed prior to pausing or stopping the execution of the software at the breakpoint, wherein the data structure that defines the breakpoint includes a field listing the one or more anchor points associated with the breakpoint and at least one of the one or more anchor points is not itself another breakpoint.

10. The system according to claim 9, wherein the breakpoint indicates the point as a function, a line number, or an address.

11. The system according to claim 9, wherein the processor is configured to set the one or more anchor points to indicate each of the other points as a function, a line number, or an address.

12. The system according to claim 9, wherein the processor is further configured to specify a hit count corresponding with each of the one or more anchor points, wherein the hit count specifies a number of executions of the respective one or more anchor points.

13. The system according to claim 12, wherein the processor is further configured to determine whether each of the one or more anchor points has reached the corresponding hit count prior to pausing or stopping the execution of the software at the breakpoint.

14. The system according to claim 9, wherein the processor is further configured to set a second breakpoint and a corresponding second set of anchor points, wherein one of the second set of anchor points includes the breakpoint.

15. The system according to claim 9, wherein the processor is further configured to set the one or more anchor points based on creating corresponding one or more data structures that define the respective one or more anchor points as an internal breakpoint that does not result in the pausing or stopping the execution of the software.

16. A computer program product for implementing software verification, the computer program product comprising a computer readable storage medium having program instructions embodied therewith, the program instructions executable by a processor to perform a method comprising:
   setting a breakpoint in the software that indicates a point at which to pause or stop execution of the software, the setting the breakpoint including creating a data structure that defines the breakpoint; and
   setting one or more anchor points associated with the breakpoint, wherein each of the one or more anchor points represents another point in the software that must be executed prior to pausing or stopping the execution of the software at the breakpoint, wherein the data structure that defines the breakpoint includes a field listing the one or more anchor points associated with the breakpoint and at least one of the one or more anchor points is not itself another breakpoint.

17. The computer program product according to claim 16, wherein the setting the breakpoint includes indicating the point as a function, a line number, or an address, and the setting the one or more anchor points includes indicating each of the other points as a function, a line number, or an address.

18. The computer program product according to claim 16, further comprising specifying a hit count corresponding with each of the one or more anchor points, wherein the hit count specifies a number of executions of the respective one or more anchor points, and determining whether each of the one or more anchor points has reached the corresponding hit count prior to the pausing or stopping the execution of the software at the breakpoint.

19. The computer program product according to claim 16, further comprising setting a second breakpoint and a corresponding second set of anchor points, wherein one of the second set of anchor points includes the breakpoint.

20. The computer program product according to claim 16, wherein the setting the one or more anchor points includes creating corresponding one or more data structures that define the respective one or more anchor points as an internal breakpoint that does not result in the pausing or stopping the execution of the software.

\* \* \* \* \*